United States Patent
Hoshizaki

(10) Patent No.: US 7,702,459 B2
(45) Date of Patent: Apr. 20, 2010

(54) GPS ACCURACY ADJUSTMENT TO MITIGATE MULTIPATH PROBLEMS FOR MEMS BASED INTEGRATED INS/GPS NAVIGATION SYSTEMS

(75) Inventor: Takayuki Hoshizaki, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 686 days.

(21) Appl. No.: 11/582,242

(22) Filed: Oct. 17, 2006

(65) Prior Publication Data
US 2008/0091351 A1 Apr. 17, 2008

(51) Int. Cl.
*G01C 21/00* (2006.01)
(52) U.S. Cl. .................. 701/214; 701/220; 342/357.06; 342/358
(58) Field of Classification Search .................. 701/200, 701/213–216, 220–221; 342/357.06, 357.12
See application file for complete search history.

(56) References Cited

U.S. PATENT DOCUMENTS

| | | | |
|---|---|---|---|
| 6,424,914 B1 * | 7/2002 | Lin | 701/214 |
| 6,449,559 B2 | 9/2002 | Lin | |
| 6,516,021 B1 * | 2/2003 | Abbott et al. | 375/150 |
| 6,754,584 B2 * | 6/2004 | Pinto et al. | 701/215 |
| 2002/0008661 A1 * | 1/2002 | McCall et al. | 342/357.14 |
| 2002/0021245 A1 * | 2/2002 | Lin et al. | 342/357.14 |

FOREIGN PATENT DOCUMENTS

JP 08-068655 3/1996

* cited by examiner

*Primary Examiner*—Yonel Beaulieu
(74) *Attorney, Agent, or Firm*—Muramatsu & Associates

(57) ABSTRACT

A method of GPS accuracy adjustment for an integrated INS/GPS navigation system which utilizes microelectro mechanical systems (MEMS) based inertial sensors to mitigate multipath problems arising when a vehicle is in an area with many high-rise buildings is disclosed. Even when GPS measurement output values are deviated from that expected, the INS/GPS navigation system uses as many measurement outliers as possible without discarding, unless they are obvious error values, thereby maintaining a practical level of accuracy. The measurement outliers typically occur when the integrated INS/GPS navigation system receives GPS signals which have transmitted through multipaths such as reflection by buildings, since the signal path lengths vary.

14 Claims, 9 Drawing Sheets

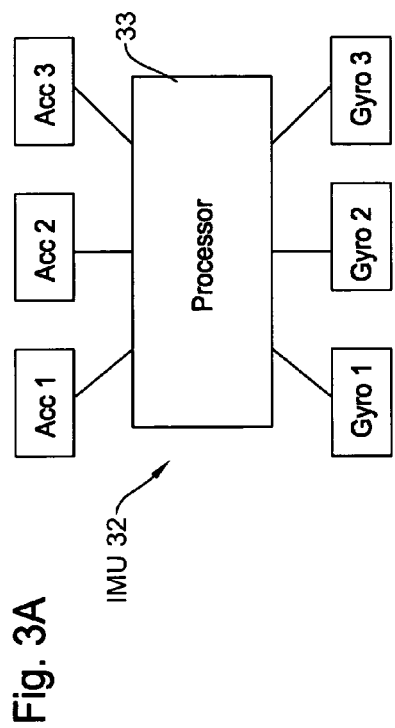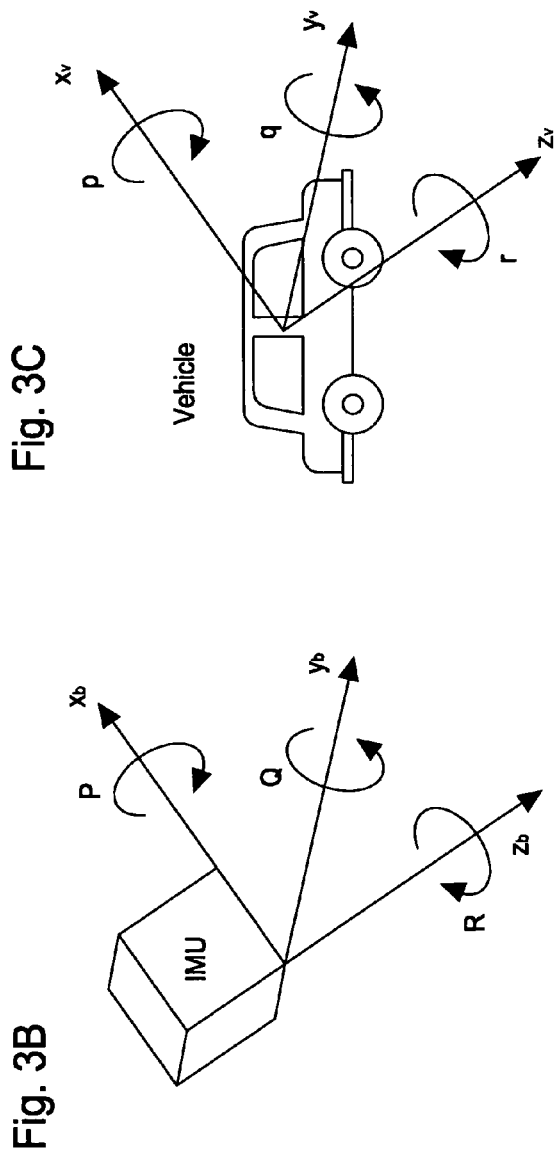
Fig. 3A
Fig. 3B
Fig. 3C

GPS ACCURACY ADJUSTMENT TO MITIGATE MULTIPATH PROBLEMS FOR MEMS BASED INTEGRATED INS/GPS NAVIGATION SYSTEMS

FIELD OF THE INVENTION

This invention relates to a method involving a vehicle navigation system, and more particularly, to a GPS accuracy adjustment method for an integrated INS/GPS navigation system which utilizes MEMS based inertial sensors for mitigating multipath problems arising when a vehicle is in an area with many high-rise buildings.

BACKGROUND OF THE INVENTION

An inertial navigation system (INS) is a widely used technology for guidance and navigation of a vehicle. The INS is composed of an inertial measurement unit (IMU) and a processor where an IMU houses accelerometers and gyroscopes which are inertial sensors detecting platform motion with respect to an inertial coordinate system. An important advantage of the INS is independence from external support, i.e., it is self-contained. However, the INS cannot provide high accuracy at long ranges. Particularly, inertial sensors are subject to errors that tend to accumulate over time, i.e., the longer the drive time, the greater the inaccuracy.

More recent developments in global positioning system (GPS) have made high accuracy vehicle navigation possible at low cost. However, since the GPS relies on GPS satellites, it is susceptible to jamming, RF (radio frequency) interference and multipath problems. Although the GPS provides accurate position and velocity over longer time periods, the GPS involves occasional large multipath errors and signal dropouts. Therefore, efforts are made to develop an integrated INS/GPS navigation system by combining the outputs of a GPS and an INS using a Kalman filter to remedy performance problems of both systems.

Inertial sensors used to be expensive and bulky only used in precision application, for example, aerospace and military navigation. For establishing an IMU package in a compact and inexpensive manner, efforts have been made to develop microelectro mechanical systems (MEMS) sensors. When a ground vehicle is, for example, in a downtown area of a city where there are many tall buildings, the navigation system receives GPS signals not only through direct paths but also multiple paths because of reflections of the GPS signals by the buildings as shown in FIG. 1. Such multipath GPS signals present problems (hereafter "mutipath problems") in a navigation system because the time of arrival of the GPS signal varies depending on the length of the path taken until reaching the GPS receiver.

Numerous researchers are studying mitigation of GPS multipath problems for a GPS receiver all by itself. While many of them try to solve this problem by modifying the correlation process internally in a GPS receiver's algorithm, some propose handy logics using a receiver's output signals to eliminate measurements including multipaths. To the best of the inventor's knowledge, there is no economical and practical solution for multipath problems applicable to integrated INS/GPS systems where the worst case performance should fall in the INS-only performance when GPS performance degradation occurs.

Therefore, there is a need of a new method to solve the GPS multipath problems in an economical and practical way for a MEMS based integrated INS/GPS navigation system which is utilizing low-cost, small, but noisier MEMS inertial sensors.

SUMMARY OF THE INVENTION

It is, therefore, an object of the present invention to provide a method of GPS accuracy adjustment for an integrated INS/GPS navigation system which utilizes MEMS based inertial sensors for mitigating multipath problems arising when a vehicle is in an area with many high-rise buildings or in a mountain area.

One aspect of the present invention is a method of GPS measurement accuracy adjustment for MEMS based integrated INS/GPS navigation systems. The method includes the steps of defining a situation when GPS multipath problems are prone to occur based on a number of visible GPS satellites, detecting measurement outliers in GPS measurement output by comparing the difference between the measurement and the corresponding Kalman filter estimate (hereafter "residual") and the corresponding measurement standard deviation ($\sigma$) theoretically computed internally in the Kalman filter (hereafter "theoretical residual $\sigma$" or "reference residual"), and employing the measurement outliers for a position tracking operation while lowering GPS reporting accuracy. The measurement outlier is in the GPS measurement output which overly differs from the corresponding Kalman filter estimate beyond the theoretical residual $\sigma$ value.

The method of the present invention further includes a step of defining degrees of accuracy adjustments depending on degrees of difference between a residual and the theoretical residual $\sigma$.

The step of defining the situation when the GPS multipath problems are prone to happen includes a process for determining the situation based on a number of visible GPS satellites or a time length after recovering the number of visible GPS satellites to a predetermined number. The step of defining the accuracy adjustments includes a process for lowering the degree of accuracy adjustment of the measurement outlier with a small degree if the amount of difference is small, and lowering the degree of accuracy adjustment of the measurement outlier with a large degree if the amount of difference is large.

The step of detecting the measurement outliers includes a process for discarding the measurement outlier when its residual is too large compared with the theoretical residual $\sigma$ value.

Another aspect of the present invention is an integrated INS/GPS navigation system implementing MEMS sensors for a ground vehicle. The integrated INS/GPS navigation system includes an INS having an IMU which incorporates MEMS sensors, a GPS receiver which receives GPS satellite signals from a plurality of GPS satellites to produce GPS measurement output indicating an absolute position and velocity of the grand vehicle, a Kalman filter which combines outputs of the INS and the GPS receiver and performs a Kalman filter processing, and an accuracy adjustment controller inside the integration Kalman filter. The measurement outlier is the GPS measurement output which overly differs from the corresponding Kalman filter estimate beyond the theoretical residual $\sigma$ value, and the measurement outlier is used for a position tracking operation while lowering accuracy of the measurement outlier.

According to the present invention, even when the GPS measurement values are deviated from that expected, the INS/GPS navigation system of the present invention uses as many measurement outliers as possible without discarding, unless they are obvious error values. Typically, measurement outliers occur when the integrated INS/GPS navigation system receives GPS signals which have transmitted through multipaths, i.e., reflection by buildings, since the signal path lengths vary. Even in such a condition, rather than simply discarding such measurement outliers, the method of the present invention utilizes the measurement outliers while adjusting the accuracy thereof depending on the degree of deviation. Since the integrated INS/GPS navigation system is able to utilize both the INS output and GPS measurement, it is possible to maintain a practical level of accuracy in the position tracking when a ground vehicle is in a downtown area with tall buildings.

BRIEF DESCRIPTION OF THE DRAWINGS

FIGS. 3A-3C are schematic diagrams showing the IMU and the inertial sensors incorporated in the IMU where FIG. 3A is a schematic block diagram showing a basic structure of the IMU, and FIGS. 3B and 3C are schematic diagrams depicting an IMU body coordinate system and a vehicle coordinate system, respectively.

DETAILED DESCRIPTION OF THE PREFERRED EMBODIMENT

The present invention will be described in detail with reference to the accompanying drawings. The method of the present invention does not rigorously detect multipath problems. Using the number of visible GPS satellites, the method assumes certain periods when multipath problems may happen. During the periods, measurement outlier's accuracy is intentionally lowered so that it does not adversely influence the INS performance, but utilizing all the measurements. The important philosophy here is to use as many measurements as possible without discarding, unless they are obvious error values.

Here, a "measurement outlier" means a parameter in the GPS measurement output whose difference from the corresponding a Kalman filter estimate overly exceeds theoretical residual σ value expected by the Kalman filter (integration Kalman filter) in an integrated INS/GPS navigation system. In other words, the theoretical residual a reference residual predetermined by the Kalman filter. Typically, a measurement outlier occurs when an integrated INS/GPS navigation system receives GPS signals which have transmitted through multipaths, i.e., reflection by buildings, mountains, interference by other signals, etc. Rather than simply discarding such measurement outliers, the method of the present invention utilizes them while adjusting the accuracy thereof depending on the degree of deviation.

In a conventional integrated INS/GPS navigation system in which outputs of a GPS and an INS are combined by using a Kalman filter, once the GPS performance is degraded because of the multipath problems, the navigation system must rely solely on the INS performance. In the present invention, however, the navigation system still utilizes the measurement outliers while adjusting (lowering) their accuracy. Since the integrated INS/GPS navigation system is able to utilize both the INS output (MEMS sensor output) and the GPS output, it is possible to maintain a practical level of accuracy in the position tracking when a vehicle is in an area of tall buildings, etc.

Figure 2:
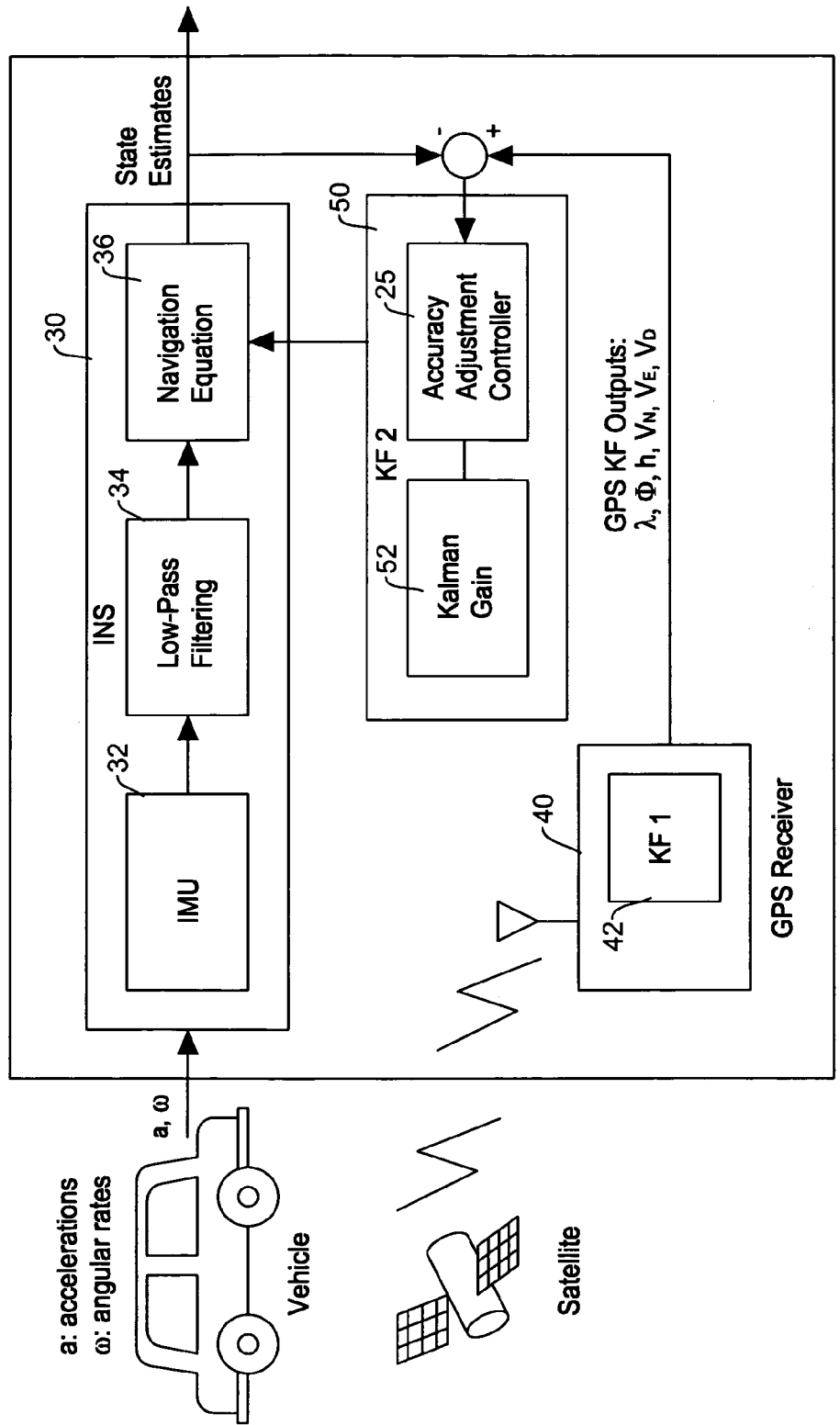
FIG. 2 is a schematic block diagram showing an example of basic configuration of the integrated INS/GPS navigation system of the present invention which is typically mounted on a ground vehicle.

FIG. 2 is a schematic block diagram showing an example of basic configuration of the integrated INS/GPS navigation system 20 of the present invention which is typically mounted on a ground vehicle. The INS/GPS navigation system 20 includes an accuracy adjustment controller 25, an inertial navigation system (INS) 30, a GPS (global positioning system) receiver 40, and a Kalman filter 50 (KF 2 or integration Kalman filter). Unlike ordinary GPS navigation systems widely used in automobiles today, the integrated INS/GPS navigation system 20 of the present invention does not use any speed pulse sensor to detect the moving distance of the automobile. Therefore, it is no longer necessary to establish complicated wiring in the vehicle for connecting a speed pulse sensor to a navigation system's processor. Further, it is unnecessary to adjust the outputs of the speed pulse sensor which was necessary in the conventional technology because the definition of speed pulse versus distance is different from manufacturer to manufacturer of speed pulse sensors.

In FIG. 2, the INS 30 is configured by an inertial measurement unit (IMU) 32, a low-pass filtering unit 34, and a navigation equation unit 36. The GPS receiver 40 includes a Kalman filter 42 (KF 1 or GPS Kalman filter) in addition to GPS signal receiver circuits and a microprocessor (not shown). Thus, this example shows a structure of a loosely coupled INS/GPS navigation system. As known in the art, in the case of a tightly coupled INS/GPS navigation system, GPS receiver 40 does not include a Kalman filter. The integration Kalman filter 50 (KF 2 ) includes the accuracy adjustment controller 25 and a Kalman gain unit 52 which provides a gain (coefficient) to each parameter associated with position tracking operations.

The IMU 32 has inertial sensors and a microprocessor. The inertial sensors are created through MEMS (microelectro mechanical system) technologies to detect accelerations and angular rates of three coordinates of the vehicle. The microprocessor processes the detected signals from the inertial sensors. Because the integrated INS/GPS navigation system 20 includes inertial sensors, it can also estimate a vertical position of the vehicle with accuracy much higher than that of the ordinary GPS navigation system. The IMU 32 produces the output data, for example, 100 times per second (100 Hz). The output data from the IMU 32 is supplied to the low-pass filtering unit 34 in which high frequency components thereof are removed. The output data from the low-pass filtering unit 34 is supplied to the navigation equation unit 36 where the current position, velocity and orientation of the vehicle are estimated through the inertial navigation technology.

The GPS receiver 40 receives GPS signals from a plurality of GPS satellites and calculates the estimated location of the vehicle by comparing clock signals and position data included in the GPS signals. The GPS receiver 40 optimizes the obtained position data by the Kalman filter (KF 1) 42 to minimize the effects of noises on the satellite signals. Typically, the GPS receiver 40 produces the position and velocity data every one second (1 Hz). Each parameter of the position and velocity data produced by the GPS receiver is accompanied by accuracy information.

The estimated position data from the INS 30 and the estimated position data from the GPS receiver 40 are combined by the Kalman filter (KF 2) 50 which optimally estimates, in real time, the states of the navigation system based on such noisy measurement data. The Kalman gain unit 52 provides weight or gain to each parameter in the measurement data. The output of the Kalman filter 50 is provided to the navigation equation unit 36 which calculates the estimated position of the vehicle which will be displayed on a navigation monitor screen (not shown).

In this example, the accuracy adjustment controller 25 takes the difference between the output data of the GPS Kalman filter (KF 1) 42 and the Kalman filter's estimates, then compares with the theoretical σ value (reference residual value) computed in the Kalman filter (KF 2) 50 to detect measurement outliers and adjust the accuracy thereof. In the case of tightly coupled INS/GPS navigation system, the accuracy adjustment controller 25 takes the difference between the raw data of the GPS receiver 40 and the Kalman filter's estimates, then compares with the theoretical σ value computed in the Kalman filter (KF 2) 50. The accuracy adjustment controller 25 lowers the accuracy information of each parameter in response to the degree of deviation of the parameter. Thus, the integration Kalman filter 50 incorporates all of the output data of the GPS receiver 40 even when the GPS output data degrades while reducing the weight of the output data based on the adjusted accuracy.

FIGS. 3A-3C are schematic diagrams showing the IMU 32 and the inertial sensors incorporated in the IMU 32. FIG. 3A is a schematic block diagram showing a basic structure of the IMU 32 used in the INS 30 of FIG. 2. The IMU 32 includes a processor 33, and the inertial sensors consisting of three (three-axis) accelerometers Acc 1-3 and three (three-axis) gyroscopes Gyro 1-3. The accelerometers Acc 1-3 detect accelerations in the three (X, Y, Z) coordinates of the vehicle, and the gyroscopes Gyro 1-3 detect angular rates about the three (X, Y, Z) coordinate directions of the vehicle. The processor 33 calculates the accelerations and angular rates based on the signals from the inertial sensors Acc 1-3 and Gyro 1-3.

FIGS. 3B and 3C are schematic diagrams depicting an IMU body coordinate system and a vehicle coordinate system, respectively. In FIG. 3B, characters P, Q, and R represent the vehicle angular rates about the IMU coordinate components $x_b$, $y_b$, and $z_b$. In FIG. 3C, characters p, q, and r represent the vehicle angular rates about the vehicle coordinate components $x_v$, $y_v$, and $z_v$, where p, q, r are the expressions simply transformed from P, Q, and R since the IMU 32 is mounted on the vehicle.

Figure 4:
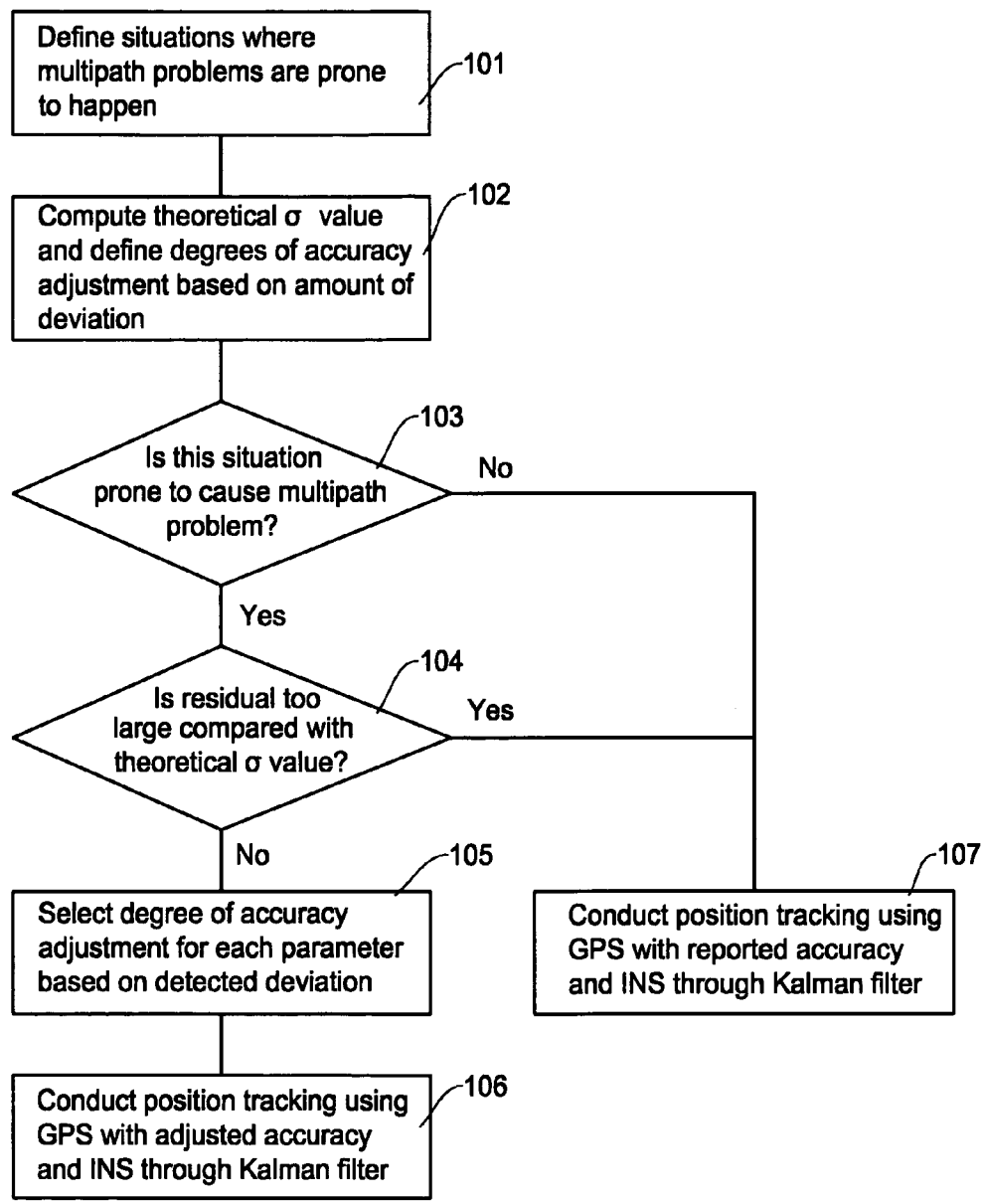
FIG. 4 is a flow chart showing an example of basic operational process of GPS accuracy adjustment in accordance with the present invention.
Figure 5:
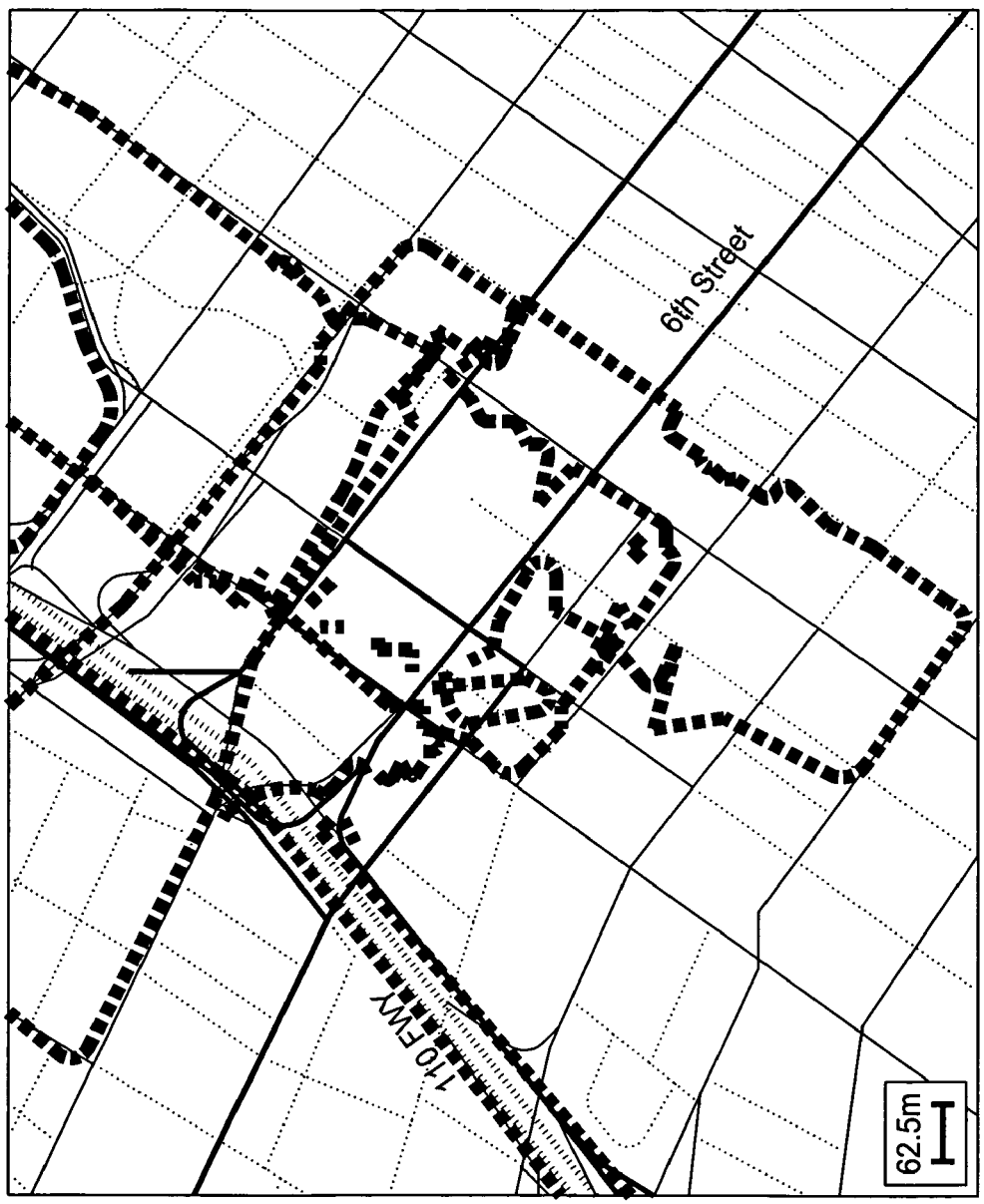
FIG. 5 shows the navigation position estimates represented by GPS Kalman filter position solutions which are heavily affected by multipath problems when a ground vehicle having the navigation system is running in a downtown area with many high rise buildings.

FIG. 4 is a flow chart showing an example of basic operational process of the GPS measurement data accuracy adjustment in accordance with the present invention. As noted above, the method of the present invention makes use of all of the measurement outliers typically caused by the multipath problems in addition to the INS measurement obtained by using the low cost, noisy MEMS sensors. The measurement outliers from the GPS receiver 40 are accompanied by accuracy adjustment information so that the integration Kalman filter (KF 2) 52 can utilized the measurement outliers for position tracking while reducing their weights. Since the measurement outliers still include useful information regarding the absolute position of the vehicle, the integrated INS/GPS navigation system is able to maintain the practical level of position tracking accuracy even when the integrated INS/GPS navigation system is heavily suffered from the multipath problems.

In the flow chart of FIG. 4, in the step 101, the process defines, in advance, a situation where the multipath problems tend to happen. An example of such a situation arises when the number of visible GPS satellites is six or less or within 20 seconds after the number of visible GPS satellites is recovered to more than six. In the step 102, the process also computes the theoretical residual σ values (reference residual values) of the differences between the measured parameters in the GPS output data and the Kalman filter estimates. The process also defines accuracy adjustments depending on the degree of deviation of the measured parameters from the Kalman filter's estimate. Typically, the accuracy adjustment is a coefficient that multiplies the reported accuracy of the GPS output data where the reported accuracy is the information contained in the GPS output data which represents the performance of the GPS receiver.

In the step 103, the integrated INS/GPS navigation system constantly checks the number of visible GPS satellites to determine whether it is in the situation where the multipath problems are prone to happen as defined in the step 101. If the number of visible GPS satellites is more than six or more than 20 seconds after the number of visible GPS satellites is recovered to more than six, the process moves to the step 108 in which the integrated INS/GPS navigation system conducts an ordinary position tracking operation based on GPS output data and INS data. In the ordinary position tracking operation, the integration Kalman filter (KF 2) incorporates the reported accuracy noted in the GPS output data without accuracy adjustment.

However, if the number of visible GPS satellites is six or less or within 20 seconds after the number of visible GPS satellites is recovered to more than six, the process moves to the step 104 in which the integrated INS/GPS navigation system compares the measured parameters in the GPS output data with the Kalman filter's estimate to determine whether the residuals are within the weighted theoretical σ value. In the step 104, if the measured parameter has a residual within the weighted theoretical σ value, the integrated INS/GPS navigation system conducts an ordinary position tracking operation based on GPS output data and INS data (IMU output data) in the step 108. In the ordinary position tracking operation, as noted above, the integration Kalman filter (KF 2) incorporates the reported accuracy noted in the GPS output data without accuracy adjustment.

In the step 104 noted above, if the measured parameter does not have a residual within the weighted theoretical σ value, i.e., it is a measurement outlier, the integrated INS/GPS navigation system selects the degree of accuracy adjustment based on the amount of deviation in the step 105. If the amount of deviation is small, the integrated INS/GPS navigation system lowers the accuracy of the measurement outliers with a small degree. If the amount of deviation is large, the integrated INS/GPS navigation system conducts lowers the accuracy of the measurement outliers with a large degree. If the amount of deviation is too large, the integrated INS/GPS navigation system discards the measured parameter.

As noted above, the measurement outliers are accompanied by the accuracy adjustment information selected in the step 105. Then, in the step 106, the integrated INS/GPS navigation system conducts a position tracking operation based on GPS output data with the adjusted accuracy in combination with the INS data. Thus, the integrated INS/GPS navigation system incorporates all of the output data of the GPS receiver 40 even when the GPS output data degrades because of the multipath problems by reducing the weight of the output data based on the adjusted accuracy.

As noted above, the main objective of the present invention is to provide a method to mitigate GPS multipath problems for low cost MEMS based integrated INS/GPS systems by (1) assuming the periods when GPS multipath problems are prone to occur using the number of visible GPS satellites, (2) detecting measurement outliers by Kalman filter's theoretical residual σ values (predetermined reference residual values) and (3) employing measurement outliers lowering the GPS reporting accuracy. More specific examples of the GPS accuracy adjustment method of the present invention are described below.

In a preferred embodiment, it is assumed that the multipath problems are prone to happen when $k \leq n_k = 6$ or within $n_t = 20$ seconds after $k > n_k$ is recovered, where k is the number of visible GPS satellites, $n_k$ and $n_t$ are design threshold values which may depend on the IMU and GPS receiver performance. During this period, the method lowers the measurement accuracy when the residuals exceed the thresholds (weighted theoretical σ values) which are multiples of Kalman filter's corresponding theoretical residual σ values. The accuracy adjustment can be made with respect to either the GPS Kalman filter solution (loosely coupled INS/GPS system) or the GPS raw data (tightly coupled INS/GPS system).

GPS Kalman Filter Solution Accuracy Adjustment

During the condition where $k \leq n_k = 6$ or within $n_t = 20$ seconds after $k > n_k$ is recovered, the following procedure will be conducted:

If: $|\phi_{obs} - \hat{\phi}| > n_p \sigma_\phi$ or $|\lambda_{obs} - \hat{\lambda}| > n_p \sigma_\lambda$ or $|h_{obs} - \hat{h}| > n_p \sigma_h$
or $|v_{N,obs} - \hat{v}_N| > n_v \sigma_{vN}$ or $|v_{E,obs} - \hat{v}_E| > n_V \sigma_{vE}$ or $|v_{D,obs} - \hat{v}_{D,obs}| > n_v \sigma_{vD}$ Then: GPS Measurement Position (φ, λ, h)
Accuracy=Reported Accuracy×$w_p$ GPS Measurement Velocity ($v_N$, $v_E$, $v_D$)
Accuracy=Reported Accuracy×$w_v$ where
$\phi_{obs}$, $\lambda_{obs}$, and $h_{obs}$ are the GPS Kalman filter's latitude, longitude, and altitude solutions, respectively.
$\hat{\phi}$, $\hat{\lambda}$, and $\hat{h}$ are the integration Kalman filter's latitude, longitude, and altitude estimates, respectively.
$v_{N,obs}$, $v_{E,obs}$, and $v_{D,obs}$ are the GPS Kalman filter's local northerly, Easterly, and vertically downward velocity solutions, respectively.
$\hat{v}_N$, $\hat{v}_E$, and $\hat{v}_D$ are the integration Kalman filter's local northerly, Easterly, and vertically downward velocity estimates, respectively.

$\sigma_\phi$, $\sigma_\lambda$, $\sigma_h$, $\sigma_{vN}$, $\sigma_{vE}$, and $\sigma_{hvD}$ are theoretical residual σ values obtained from the integration Kalman filter
$w_p = 10$, and $w_v = 5$ are accuracy adjustment coefficients
$n_p = 2$, $n_v = 3$ are design parameters.
The reported accuracy is given by the GPS receiver.

GPS Raw Data Accuracy Adjustment

During the condition where $k \leq n_k = 6$ or within $n_t = 20$ seconds after $k > n_k$ is recovered, the following procedure will be conducted:

If: $|\rho_{i,obs} - \hat{\rho}_i| > n_{p1} \sigma_{\rho i}$ or $|\dot{\rho}_{i,obs} - \hat{\dot{\rho}}_i| > n_{v1} \sigma_{\dot\rho i}$ (difference from the theoretical σ value is too large)

Discard the i-th measurements for ρ and $\dot{\rho}$.

If: $|\rho_{i,obs} - \hat{\rho}_i| > n_{p2} \sigma_{\rho i}$ or $|\dot{\rho}_{i,obs} - \hat{\dot{\rho}}_i| > n_{v2} \sigma_{\dot\rho i}$ (difference from the theoretical σ value is relatively large)

ρ Measurement Accuracy=$R_\rho \times w_{p2}$ $\dot{\rho}$ Measurement Accuracy=$R_{\dot\rho} \times w_{v2}$ If: $|\rho_{i,obs} - \hat{\rho}_i| > n_{p3} \sigma_{\rho i}$ or $|\dot{\rho}_{i,obs} - \hat{\dot{\rho}}_i| > n_{v3} \sigma_{\dot\rho i}$ (difference from the theoretical σ value is relatively small)

ρ Measurement Accuracy=$R_\rho \times w_{p3}$ $\dot{\rho}$ Measurement Accuracy=$R_{\dot\rho} \times w_{v3}$ where
$\rho_{i,obs}$ is the GPS pseudorange measurement for the i-th satellite.
$\hat{\rho}_i$ is the integration Kalman filter's pseudorange estimate for the i-th satellite.
$\dot{\rho}_{i,obs}$ is the GPS pseudorange rage measurement for the i-th satellite.
$\hat{\dot{\rho}}_i$ is the integration Kalman filter's pseudorange rate estimate for the i-th satellite.
$\sigma_{\rho i}$ and $\sigma_{\dot\rho i}$ are theoretical residual σ values obtained from the integration Kalman filter.
$R_\rho = 2$ m, $R_{\dot\rho} = 0.1$ m/s
$n_{p1} = 20$, $n_{v1} = 10$
$n_{p2} = 10$, $n_{v2} = 5$, $w_{p2} = 20$, $w_{v2} = 10$
$n_{p3} = 2$, $n_{v3} = 3$, $w_{p3} = 10$, $w_{v3} = 5$ Note that $n_k$, $n_t$, $n_p$, $n_v$, $R_\rho$, and $R_{\dot\rho}$ are design parameters which may depend on a GPS receiver's performance, and $w_p$, and $w_v$, are accuracy adjustment coefficients.

Experimental Results

The effectiveness of the present invention is demonstrated by conducting on-road data acquisition and formulating integrated INS/GPS systems on a PC to see navigation results in a post-process manner. First, a conventional loosely coupled INS/GPS system is used with GPS Kalman filter solutions as measurements. Second, the system is augmented with raw GPS measurements resembling a conventional tightly coupled INS/GPS system yet with GPS Kalman filter solutions (referred to as "augmented tightly coupled INS/GPS system" for convenience). In either of them, the navigation systems with and without the present invention are compared. As noted above, the IMU comprises MEMS level three-axis accelerometers and three-axis rate gyroscopes.

Figure 1:
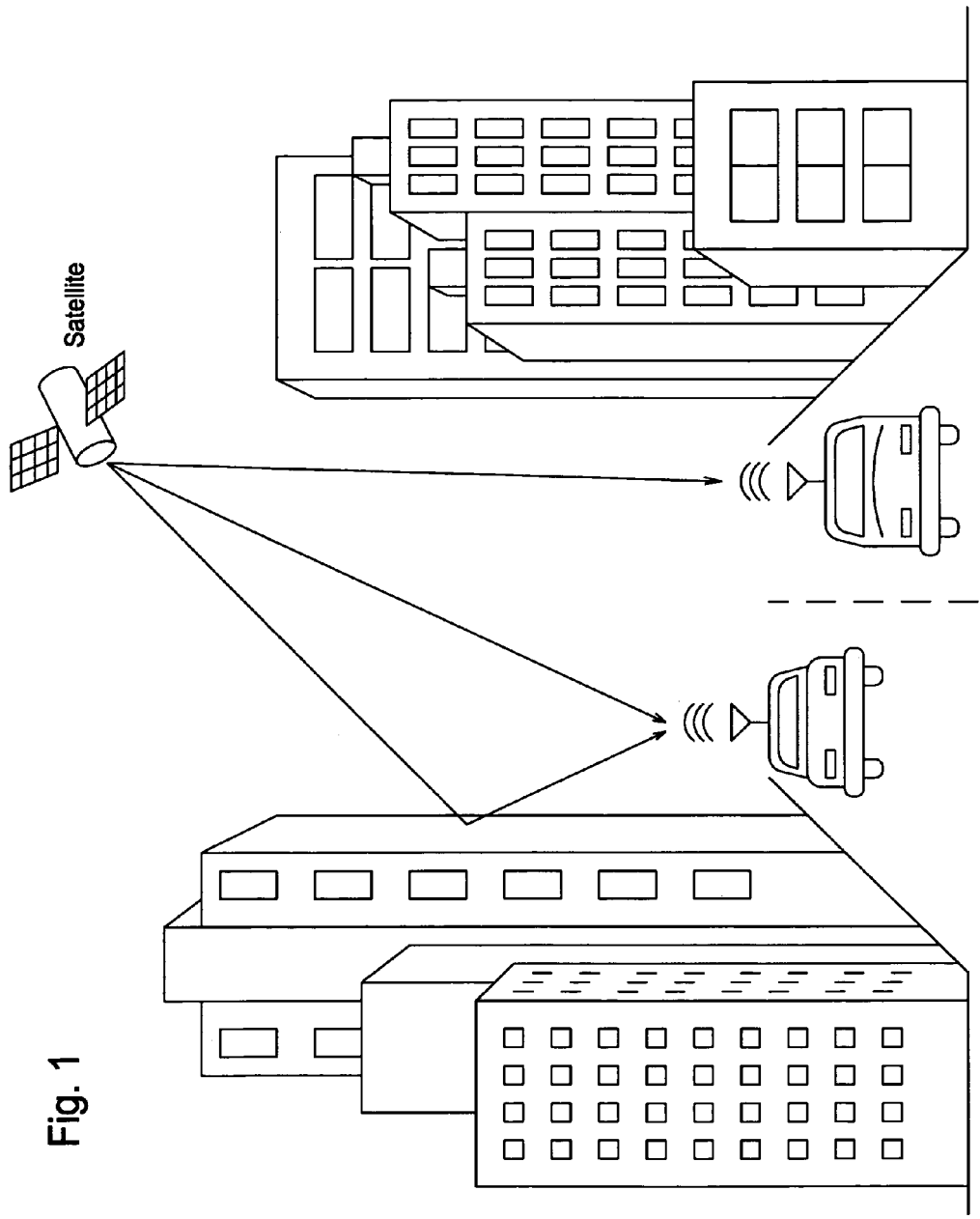
FIG. 1 is a schematic diagram illustrating a situation where a ground vehicle carrying a navigation system is running in a downtown area with many tall buildings in which GPS multipath problems tend to happen.

In FIGS. 5-9, vehicle trajectories estimated by navigation systems are plotted by solid square dots in a road map where the vehicle is running through the Los Angeles downtown area. As FIG. 1 shows, the surrounding area is a highly unfavorable environment to the GPS deeply inside an urban canyon. As expected, GPS Kalman filter navigation solutions are severely influenced by multipath problems noticed by FIG. 5 in which the vehicle trajectories fluctuate and deviates from roads.

Figure 6:
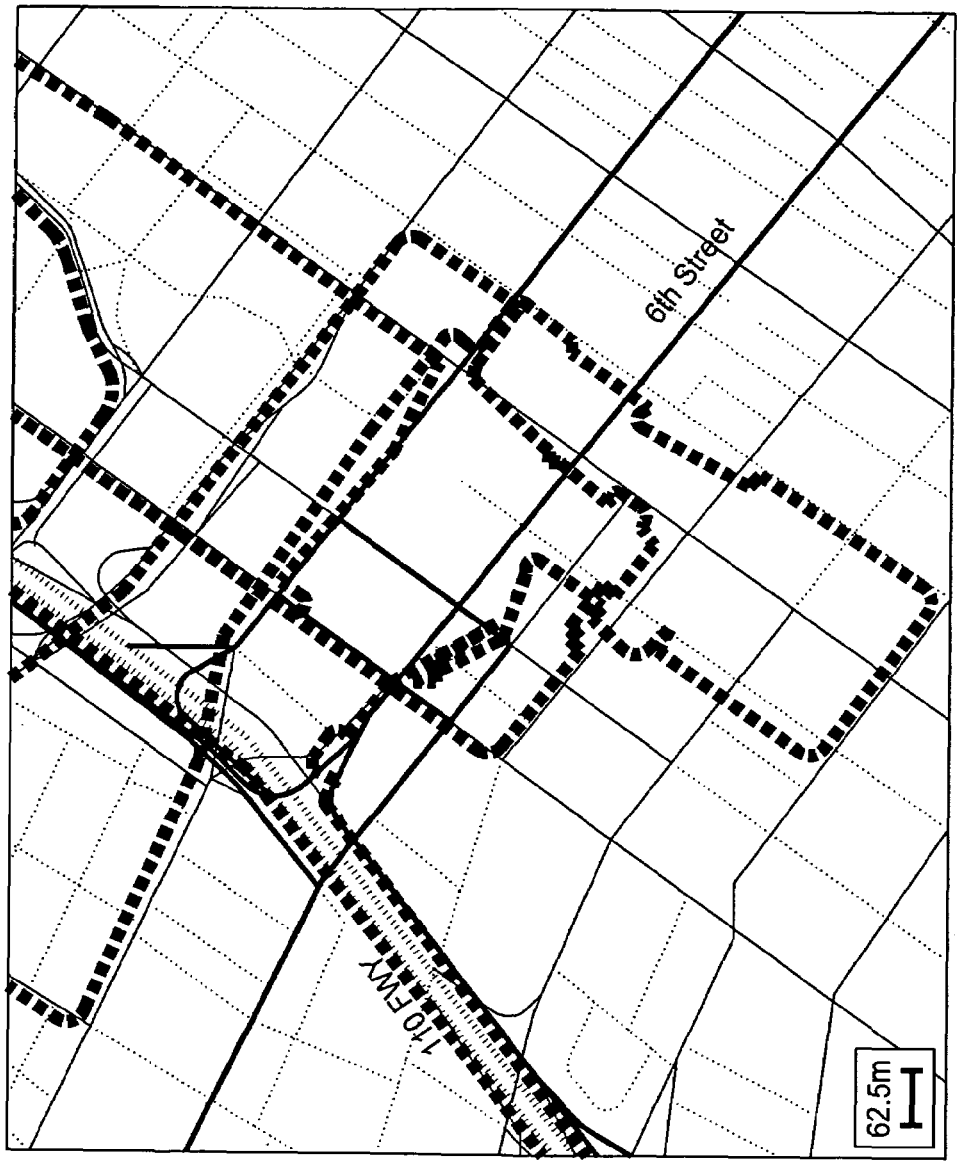
FIG. 6 shows the navigation results using a conventional loosely coupled INS/GPS system for the same downtown area of FIG. 5.
Figure 7:
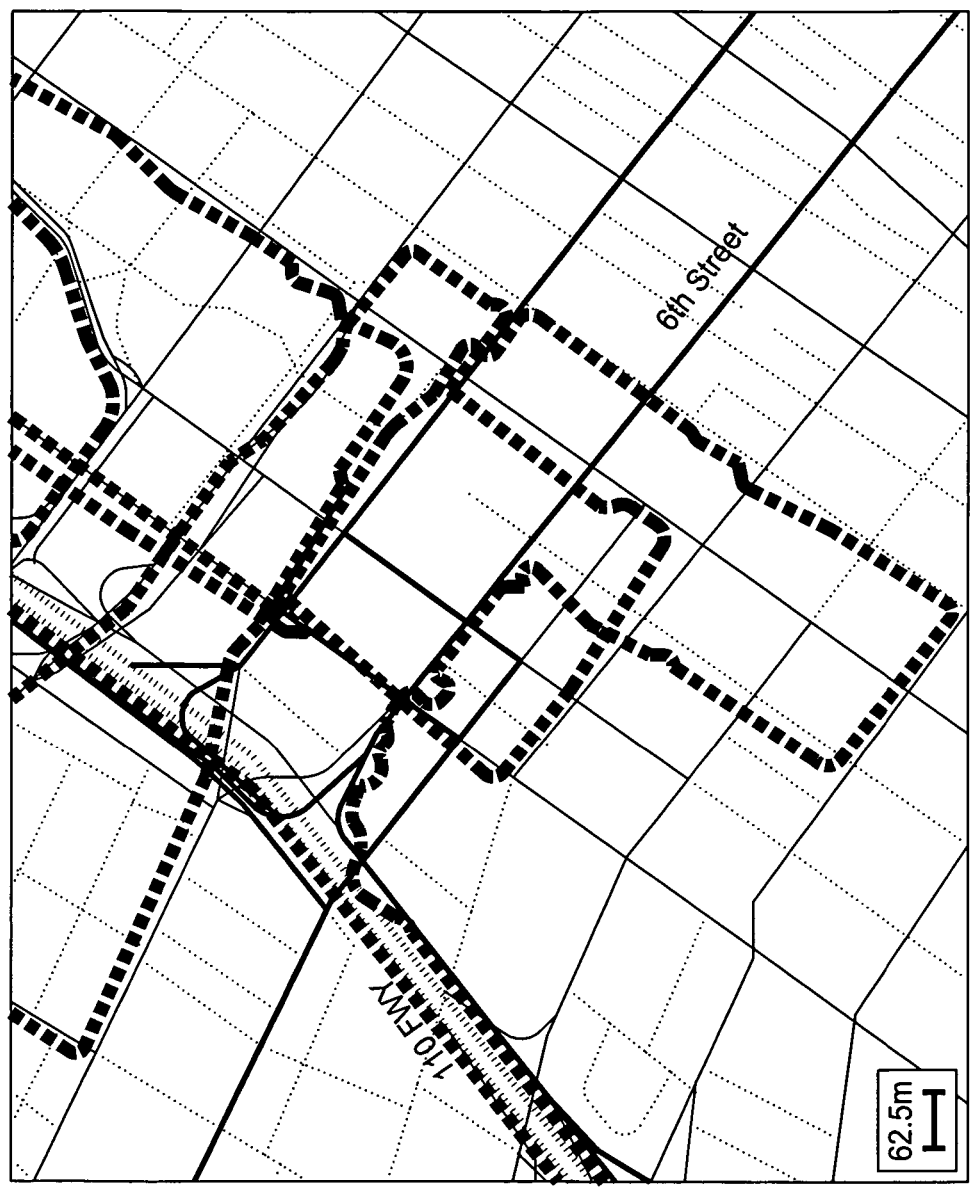
FIG. 7 shows the navigation results using an augmented tightly coupled INS/GPS system where GPS raw measurement data are used in addition to GPS Kalman filter solutions for the integration Kalman filter's measurements for the same downtown area of FIG. 5.

Then, the navigation results from a loosely coupled and an augmented tightly coupled INS/GPS systems are shown in FIG. 6 and FIG. 7, respectively. Note that these systems are not using the accuracy adjustment method of the present invention. Navigation performance is improved noticeably because of the integration of the INS and GPS, however, degraded GPS performance still remains.

Figure 8:
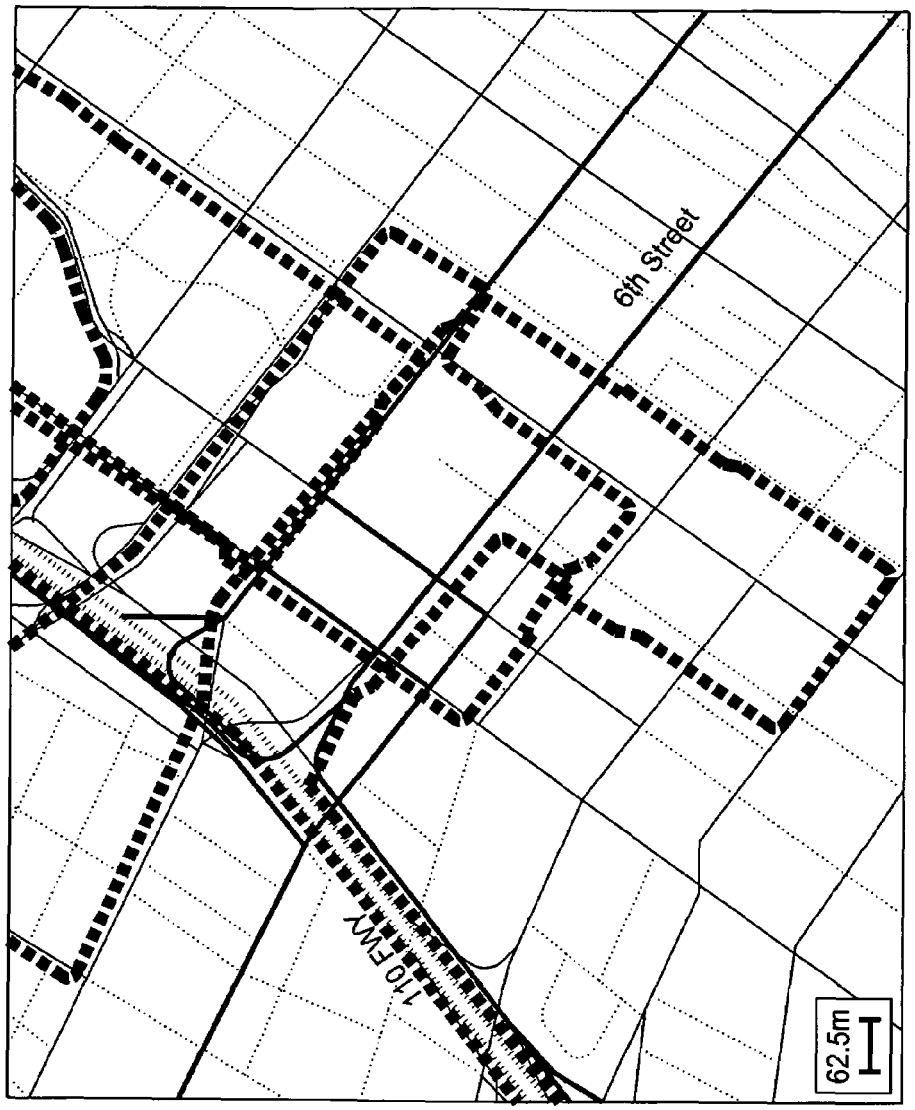
FIG. 8 shows the navigation results using the loosely coupled INS/GPS system similar to that of FIG. 6 for the same downtown are of FIG. 5 while applying the accuracy adjustment method of the present invention.
Figure 9:
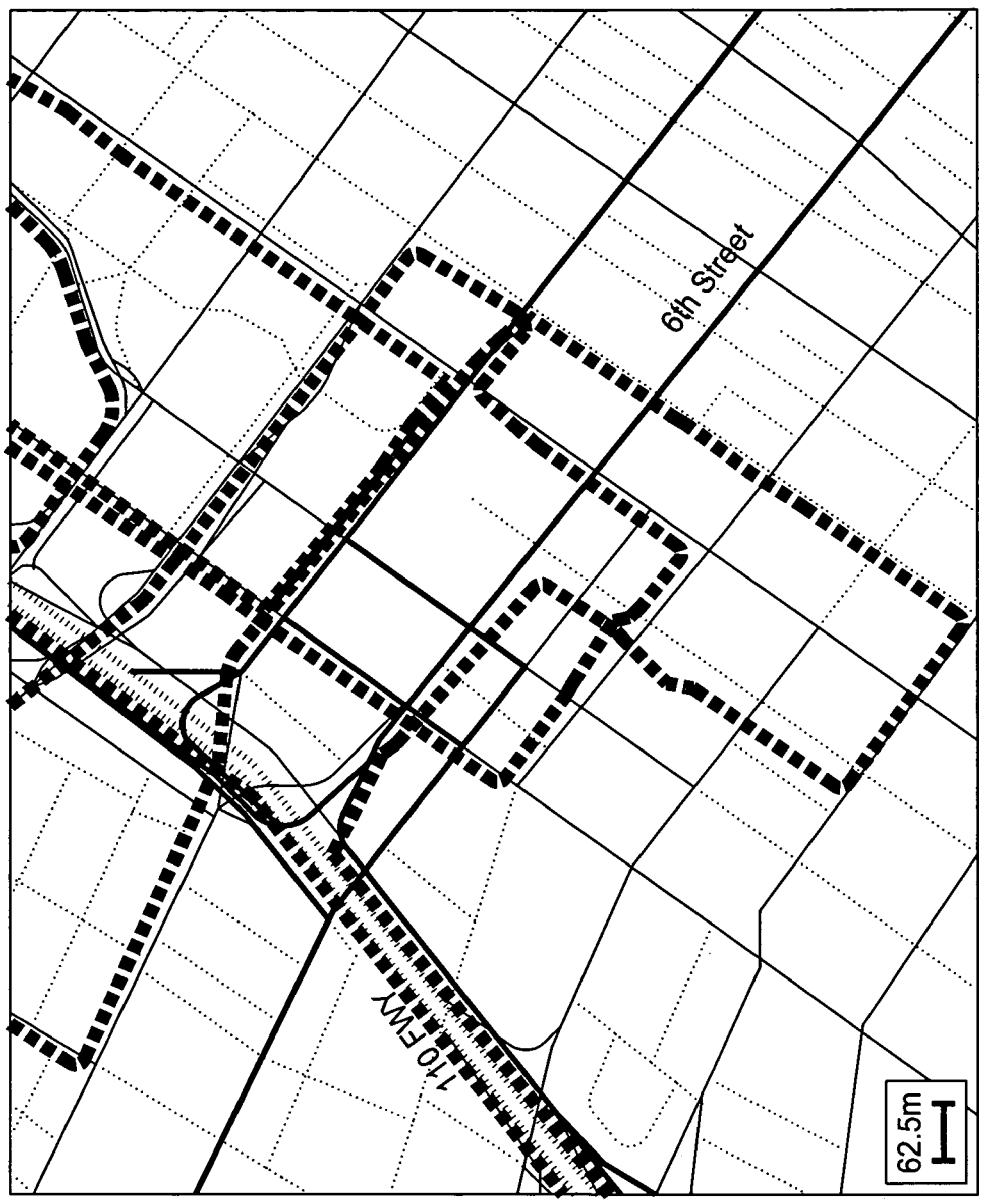
FIG. 9 shows the navigation results using an augmented tightly coupled INS/GPS system similar to that of FIG. 7 for the same downtown area of FIG. 5 while applying the accuracy adjustment method of the present invention.

The present invention is implemented to the corresponding systems of FIG. 6 and FIG. 7 and the navigation results are shown in FIG. 8 and FIG. 9, respectively. GPS measurements' adverse effects due to multipath problems are significantly reduced in either system, except occasional biases that still remain. It should also be noted that the map streets are represented by width-less lines and the map database has also errors, which may be the cause of the occasional biases. Comparing FIG. 6 and FIG. 8 (loosely coupled case), or comparing FIG. 7 and FIG. 9 (tightly coupled case), it can be seen that adding GPS measurement outliers is effective for smooth vehicle trajectories.

As has been described above, according to the present invention, even when the GPS measurement values are deviated from that expected, the INS/GPS navigation system of the present invention uses as many measurement outliers as possible without discarding, unless they are obvious error values. As noted above, typically, measurement outliers occur when the integrated INS/GPS navigation system receives GPS signals which have transmitted through multipaths, i.e., reflection by buildings, since the signal path lengths vary. Even in such a condition, rather than simply discarding such measurement outliers, the method of the present invention utilizes the measurement outliers while adjusting the accuracy thereof depending on the degree of deviation. Since the integrated INS/GPS navigation system is able to utilize both the INS output and the GPS measurement, it is possible to maintain a practical level of accuracy in the position tracking when a vehicle is in an area of tall buildings.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of GPS measurement accuracy adjustment for microelectro mechanical system (MEMS) based integrated INS/GPS (inertial navigation system)/(global positioning system) navigation systems, comprising the following steps of:

defining a situation when GPS multipath problems are prone to occur based on a number of visible GPS satellites;

detecting measurement outliers in GPS measurement output based on a difference between a residual value and a reference residual value; and employing the measurement outliers for a position tracking operation while lowering GPS reporting accuracy;

wherein the measurement outlier is a parameter in the GPS measurement output whose difference from the corresponding Kalman filter estimate overly exceeds the reference residual value predetermined by the Kalman filter.

2. The method of GPS measurement accuracy adjustment as defined in claim 1, wherein said step of defining the situation when the GPS multipath problems are prone to happen includes a process for determining the situation based on a number of visible GPS satellites or a time length after recovering the number of visible GPS satellites to a predetermined value.

3. The method of GPS measurement accuracy adjustment as defined in claim 1, further comprising a step of defining degrees of accuracy adjustments depending on degrees of difference between the residual and the predetermined reference residual value.

4. The method of GPS measurement accuracy adjustment as defined in claim 3, wherein said step of defining the accuracy adjustments includes a process for lowering the degree of accuracy adjustment of the measurement outlier with a small degree when the amount of difference is small, and lowering the degree of accuracy adjustment of the measurement outlier with a large degree when the amount of difference is large.

5. The method of GPS measurement accuracy adjustment as defined in claim 1, wherein said step of detecting the measurement outliers includes a process for discarding the measurement outlier when the difference from the predetermined reference residual value is too large.

6. The method of GPS measurement accuracy adjustment as defined in claim 4, wherein said step of employing the measurement outliers for the position tracking operation includes a process for attaching information showing the degree of accuracy adjustment to the measurement outlier when the measurement outlier is sent to an integration Kalman filter which integrates INS and GPS.

7. An integrated INS (inertial navigation system)/GPS (global positioning system) navigation system implementing microelectro mechanical system (MEMS) sensors for a grand vehicle, comprising:

an inertial navigation system (INS) having an inertial measurement unit (IMU) which incorporates MEMS sensors;

a GPS (global positioning system) receiver which receives GPS satellite signals from a plurality of GPS satellites to produce GPS measurement output indicating an absolute position and velocity of the ground vehicle;

a Kalman filter which combines outputs of the INS and the GPS receiver and performs a Kalman filter processing; and an accuracy adjustment controller which controls an overall operation of the navigation system including accuracy adjustment operations with respect to measurement outliers contained in the GPS measurement output;

wherein the measurement outlier is a parameter in the GPS measurement output whose difference from the corresponding Kalman filter estimate overly exceeds a predetermined reference residual value, and the measurement outlier is used for a position tracking operation while lowering its accuracy reported by the GPS receiver.

8. The integrated INS/GPS navigation system as defined in claim 7, wherein said MEMS sensors are configured by three-axis accelerometers and three-axis gyroscopes in which accelerations corresponding to coordinates of the vehicle are detected by the three accelerometers and angular rates corresponding to coordinate directions of the vehicle are detected by the three gyroscopes.

9. An integrated INS (inertial navigation system) /GPS (global positioning system) navigation system implementing microelectro mechanical system (MEMS) sensors for a ground vehicle, comprising:

means for defining a situation when GPS multipath problems are prone to occur based on a number of visible GPS satellites;

means for detecting measurement outliers in GPS measurement output based on a difference between a residual value in the measurement output and a reference residual value;

means for employing the measurement outliers for a position tracking operation while lowering GPS reporting accuracy;

wherein the measurement outlier is a parameter in the GPS measurement output whose difference from Kalman filter estimate overly exceeds the reference residual value.

10. The integrated INS/GPS navigation system as defined in claim 9, wherein said means for defining the situation when the GPS multipath problems are prone to happen includes means for determining the situation based on a number of visible GPS satellites or a time length after recovering a number of visible GPS satellites to a predetermined number.

11. The integrated INS/GPS navigation system as defined in claim 9, further comprising means for defining degrees of accuracy adjustments depending on degrees of difference between a residual value and the reference residual value.

12. The integrated INS/GPS navigation system as defined in claim 11, wherein said means for defining the degrees of accuracy adjustments includes means for lowering the degree of accuracy adjustment of the measurement outlier with a small degree when the amount of difference is small and for lowering the degree of accuracy adjustment of the measurement outlier with a large degree when the amount of difference is large.

13. The integrated INS/GPS navigation system as defined in claim 9, wherein said means for detecting the measurement outliers includes means for discarding the measurement outlier when its residual value is too large compared with the reference residual value.

14. The integrated INS/GPS navigation system as defined in claim 12, wherein said means for employing the measurement outliers for the position tracking operation includes means for attaching information showing the degree of accuracy adjustment to the measurement outlier when the measurement outlier is sent to an integration Kalman filter which integrates INS and GPS.

* * * * *